United States Patent [19]

Diamantoglou et al.

[11] Patent Number: 5,171,444
[45] Date of Patent: Dec. 15, 1992

[54] DIALYSIS MEMBRANE MADE OF POLYSACCHARIDE ETHER

[75] Inventors: Michael Diamantoglou, Erlenbach; Horst-Dieter Lemke, Obernburg, both of Fed. Rep. of Germany

[73] Assignee: Akzo N.V., Netherlands

[21] Appl. No.: 708,788

[22] Filed: May 31, 1991

[30] Foreign Application Priority Data

Jun. 1, 1990 [DE] Fed. Rep. of Germany ....... 4017745

[51] Int. Cl.$^5$ .............................................. B01D 71/22
[52] U.S. Cl. ............................ 210/500.23; 210/500.29
[58] Field of Search ..................... 210/500.23, 500.29, 210/500.24, 500.3, 500.31, 500.32; 427/245, 246

[56] References Cited

U.S. PATENT DOCUMENTS 4,962,140 10/1990 Diamantoglou ........... 210/500.29 X

FOREIGN PATENT DOCUMENTS

| | | |
|---|---|---|
| 0300250 | 7/1988 | European Pat. Off. . |
| 0319862 | 12/1988 | European Pat. Off. . |
| 0319938 | 12/1988 | European Pat. Off. . |
| 0330106 | 2/1989 | European Pat. Off. . |
| 0330134 | 2/1989 | European Pat. Off. . |
| 0339200 | 2/1989 | European Pat. Off. . |
| 0172437 | 9/1989 | European Pat. Off. . |
| 2736205 | 2/1979 | Fed. Rep. of Germany . |
| 3524596 | 1/1987 | Fed. Rep. of Germany . |
| 3840174 | 6/1989 | Fed. Rep. of Germany . |
| 3901946 | 9/1989 | Fed. Rep. of Germany . |
| 3814326 | 11/1989 | Fed. Rep. of Germany . |
| 8503295 | 8/1985 | PCT Int'l Appl. . |
| 8806476 | 9/1988 | PCT Int'l Appl. . |
| 606231 | 10/1978 | Switzerland . |

OTHER PUBLICATIONS

Chemical Abstract-vol. 111, 1989, ref. 25217z.

Primary Examiner—Frank Spear
Attorney, Agent, or Firm—Oliff & Berridge

[57] ABSTRACT

Dialysis membrane for hemodialysis in the form of membrane films, tubular films, or hollow filaments made of polysaccharide ethers, are characterized by the fact that the polysaccharide ether has a structure shown by the formula $$\text{Cell} \begin{cases} [O-R]_x \\ [OH]_{s-x} \end{cases}$$

in which Cell is the skeleton of the unmodified cellulose molecule or of the chitin molecule, without hydroxyl groups in each case, s is 3 in the unmodified cellulose molecule and 2 in the chitin molecule, and x corresponds to the degree of etherification, which is in the range from 0.08 to (s−0.4).

7 Claims, No Drawings

DIALYSIS MEMBRANE MADE OF POLYSACCHARIDE ETHER

BACKGROUND OF THE INVENTION

This invention relates to a dialysis membrane for hemodialysis in the form of films, tubular films, or hollow filaments made of polysaccharide ethers.

Dialysis membranes for hemodialysis have very stringent requirements with regard to biocompatibility so that the blood flowing through the membranes is damaged as little as possible. Important parameters of biocompatibility are blood coagulation, leukopenia, and complement activation.

DE-OS 35 24 596 has already disclosed a dialysis membrane with improved biocompatibility that is able to reduce blood coagulation, leukopenia, and complement activation to a considerable extent and that is distinguished by modified cellulose whose average degree of substitution is 0.02 to 0.07. The known dialysis membrane made of modified cellulose preferably contains modified cellulose that has a structure represented by the formula

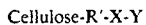

in which
X stands for -NR"- and/or

and/or -S- and/or -SO- and/or -SO$_2$- and/or

and/or —CO—O—and/or —O—;
Y stands for -R and/or -NR$_2$ and/or -Si(OR")$_3$ and/or —SO$_3$H and/or —COOH and/or —PO$_3$H$_2$ and/or —NHR$_2$ or their salts;

R' stands for an alkylene group and/or a cyclo-alkylene group and/or an arylene group with a total of 1 to 25 carbon atoms;
R" stands for a hydrogen atom or R; and
R stands for an alkyl group with 1 to 5 carbon atoms and/or a cycloalkyl group and/or an aryl group.

Besides the fact that dialysis membranes made of synthetic or natural polymers can very easily cause clotting of the blood when used in artificial kidneys, which is largely prevented by appropriate medical treatment, a temporary decrease of leukocytes occurs early in the dialysis treatment of a kidney patient with dialyzers that contain membranes made of regenerated cellulose. This effect is called leukopenia.

Leukopenia is a lowering of the leukocyte count (white blood corpuscles) in the circulatory system. The number of white blood corpuscles in humans is about 4,000 to 12,000 cells/mm$^3$. Leukopenia is most pronounced 15 to 20 minutes after beginning treatment, at which time the neutrophils (leukocytes that can be stained with neutral or at the same time with acidic and basic dyes) may almost completely disappear. The leukocyte count then increases again in about an hour almost to the initial level, or exceeds it. When a new dialyzer is connected after recovery of the leukocytes, leukopenia again occurs to the same degree.

Cellulose membranes cause pronounced leukopenia. Even though the clinical significance of the leukopenia is not scientifically understood, nevertheless there is a desire for a dialysis membrane for hemodialysis that does not show the effect of leukopenia, without the other very desirable properties of dialysis membranes made of regenerated cellulose thereby being impaired.

In addition to leukopenia, distinct complement activation has also been found during hemodialysis with membranes made of regenerated cellulose. The complement system in the blood is a complex plasma enzyme system consisting of many components that functions in various ways in defending against injuries from invading foreign cells (bacteria and others). When antibodies against the invading organism are present, complement-specific activation can occur from the complex of the antibodies with antigenic structures of the foreign cells; otherwise, complement activation occurs by an alternative pathway through special surface features of the foreign cells. The complement system depends on a number of plasma proteins. After activation, these proteins react specifically with one another in a definite sequence, and at the end, a cell-injuring complex is formed that destroys the foreign cells.

From individual components, peptides are liberated that trigger inflammation and sometimes may also have adverse pathological consequences for the organism. It is assumed that the activation in the case of hemodialysis membranes made of regenerated cellulose occurs by the alternative pathway. These complement activations are determined objectively by determination of the complement fragments C3a and C5a in the plasma.

Reference in this regard is made to the following papers: D. E. Chenoweth et al., Kidney International Vol. 24, pages 764 ff, 1983, and D. E. Chenoweth, Asaio-Journal Vol. 7, pages 44 ff, 1984.

In the context of this invention, complement activation was judged by reference to the C5a fragments. To do this, 300 ml of heparinized blood plasma was recirculated in vitro for a period of 4 hours through a dialyzer with an effective exchange area of 1m$^2$ with a plasma flow rate of 100 ml/min. The C5a fragments in the plasma were determined by the RIA method (Upjohn test). The relative complement activation for the particular time of measurement was calculated by taking the ratio of the concentration at the time of sampling to the initial value in percent. The value measured after 4 hours of recirculation was used for the evaluation. Membrane films are incubated for 3 hours with heparinized blood plasma and the C5a fragments are then determined.

An increase of the beta-2-microglobulin level in long-term dialysis patients is observed after using membranes made of regenerated cellulose, and is attributed to the fact that these membranes are less permeable in the molecular range of 1,000 to 20,000 and the microglobulins are therefore not sufficiently removed in the dialysis. Beta-2-micro-globulin is not adsorbed to a significant extent on conventional membranes made of regenerated cellulose. However, the cellulose derivatives pursuant to the invention can contribute to this in an unexpected way.

The average degree of polymerization DP was determined in a cuene solution by the method of DIN 54270.

The degree of etherification was determined from the results of analysis which are known and typical for the substituents, for example nitrogen by Kjeldahl, sulfur by the Schoniger method, or phosphorus by the molybdate method, when applicable from the difference before and after saponification.

It has recently been found that it is desirable to avoid the heparin adsorption which occurs to a distinct degree particularly with the polysaccharide ethers pursuant to DE-OS 35 24 596. Multiple use of the membrane modules is also desirable to moderate costs, which is naturally reasonable and defensible only when the modules can be cleaned and disinfected perfectly without the desirable properties of the membranes being impaired.

However, in the procedures used up to this time for preparation for reuse, it is precisely the parameters crucial for biocompatibility that have been distinctly impaired, and steam sterilization has led to yellowing of the membranes.

SUMMARY OF THE INVENTION

Although dialysis membranes with polysaccharide ethers and good biocompatibility characteristics are already known, there is a need to improve them further. Therefore, it is an object of this invention to avoid to a great extent the adsorption of hepain in biocompatible dialysis membranes made of polysaccharide ethers, and to prevent impairment by steam sterilization and the treatments necessary for reuse.

This and other objects are achieved in a dialysis membrane for hemodialysis in the form of films, tubular films, or hollow filaments by a polysaccharide ether that has a structure given by the formula

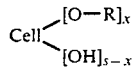

in which Cell is the skeleton of the unmodified cellulose molecule or of the chitin molecule, without hydroxyl groups in each case, s is equal to 3 in the unmodified cellulose molecule and 2 in the chitin molecule, and x corresponds to the degree of etherification, which is in the range of 0.08 to $(s-0.4)$, and in which R is an optionally substituted alkyl, alkenyl and/or alkynyl and/or cycloalkyl and/or cycloalkenyl and/or cycloalkynyl and/or arylalkyl and/or arylalkenyl and/or arylalkynyl and/or bisarylalkyl and/or bisarylalkenyl and/or bisaryl-alkynyl group with 5 to 40 carbon atoms, and/or the radical of a condensed aromatic (optionally substituted) compound and/or the radical of a heterocyclic (optionally substituted) compound.

DETAILED DESCRIPTION OF PREFERRED EMBODIMENTS

Preferred embodiments are characterized by the choice of R group and substituents, and degree of etherification. Thus, properties of the membrane material, for example the solubility in certain cellulose solvents, can be controlled by substitution of the group R. In accordance with one embodiment, therefore, polysaccharide ethers are preferred in which the substituent is a nonionic group such as halogen and/or nitrile and/or nitro and/or R′O— and/or R′S— and/or R′CO— and/or R′CS— and/or R′SO— and/or R′SO$_2$— and/or an ester group, in which R′=H or R.

The dialysis membranes pursuant to the invention are formed by regeneration of polysaccharide ethers from solutions in aqueous or nonaqueous cellulose solutions by a known method.

In another preferred embodiment the substituent is an ionic group such as a carboxyl and/or phosphonate and/or silicate and/or sulfonate group. Preferred according to the invention are polysaccharide ethers in which R is a benzyl, methylbenzyl, chlorobenzyl, hexyl, dodecyl, hydroxydodecyl, or octadecyl group, optionally substituted.

Impairment of the dialysis membranes during treatment for reuse is prevented to a special degree by the selection of these groups.

In a special embodiment of the invention, the degree of etherification is x =0.1 to 00.5. This range is important in particular, for example, when the membrane is to be regenerated from cuoxam solutions or from viscose solutions. This range is particularly important also when the group R is unsubstituted.

In another embodiment of the invention, the degree of etherification x in a chitin skeleton (therefore, when s =2) is 0.5 to 1.5.

Another preferred embodiment with a cellulose skeleton (therefore, when s =3) consists of the degree of etherification being x =0.5 to 2.0. This embodiment is used successfully especially when essentially nonaqueous cellulose solvents are used to form the membrane, or when the etherification is done on the membrane after it is formed.

The invention will be described below with reference to the following non-limiting examples.

EXAMPLE 1

324 g (2 moles) of linters cellulose was made alkaline in 1 hour at 16° C. with 40 g (1 mole) of sodium hydroxide dissolved in 250 ml of water in a 10-liter Drais mixer. After adding 250 ml of i-propanol and 75.9 g (0.6 mole) of benzyl chloride, the mixture was stirred for 24 h at 80° C. The reaction product was taken up in ethanol, filtered by suction, washed in succession with ethanol, water, and ethanol until free of alkali and chloride, and dried in a vacuum oven at 60° C. 340.8 g of a product was obtained with a degree of etherification of x =0.11.

A 5% cuoxam solution was prepared from this derivative by the usual procedure and was processed into membrane films. In comparison with unmodified cellulose membrane, the C5a activation is reduced by 92%.

Part of the membrane was sterilized with steam at 121° C. for 30 min. Even after the steam treatment the membrane showed a C5a reduction of 90% compared to the unmodified cellulose membrane.

A 15-minute treatment of the membranes with 1% aqueous sodium hypochlorite solution or 4% aqueous peracetic acid solution likewise led to no loss of activity. The C5a reduction was 91%.

By the test method of Deutschen Kabi Vitrum GmbH, the membranes absorb no heparin.

EXAMPLE 2

324 g (2 moles) of linters cellulose was made alkaline in 1 hour at 16° C. in a 10-liter Drais mixer with 160 g (4 moles) of sodium hydroxide dissolved in 300 ml of water. After adding 400 ml of i-propanol and 421.8 g (3 moles) of 4-methylbenzyl chloride, the mixture was stirred for 8 h at 80° C. The reaction product was filtered by suction, washed successively with ethanol, water, and ethanol until free of alkali and chloride, and dried in a vacuum oven at 60° C. 440 g of a product was obtained with a degree of etherification of x = 0.60.

A solution with 5% cellulose derivative, 7% lithium chloride, and 88% dimethylacetamide was prepared from this derivative by the usual method and processed into membrane films. Compared to unmodified cellulose membrane, the C5a activation is reduced by 95%. The high C5a reduction obtained also remained after treatment of the membranes with steam, aqueous sodium hypochlorite solution, or peracetic acid solution, similarly to Example 1. The membranes likewise absorb no heparin.

EXAMPLE 3

324 g (2 moles) of linters cellulose was made alkaline in a 10-liter Drais mixer for 1 h at 16° C with 240 g (6 moles) of sodium hydroxide dissolved in 600 ml of water. 4 liters of toluene was first added to the mixture, and after distilling off the water, 2 liters of pyridine and 1333.6 g (4 moles) of 1-bromooctadecane were added. The mixture was then stirred for 48 h at 110° C., the reaction product was filtered by suction, washed successively with toluene, ethanol, water, and ethanol until free of alkali and chloride, and dried at 60° C. in a vacuum oven. 390 g of a product was obtained with a degree of etherification of x 32 0.16.

A solution with 5% cellulose derivative, 7% lithium chloride, and 88% dimethylacetamide was prepared by the usual method and processed into membrane films. In comparison with unmodified cellulose membrane, the C5a activation is reduced by 88%. Even after treatment with steam, aqueous sodium hypochlorite solution, or peracetic acid solution, the membranes showed a C5a reduction of 85% compared to the unmodified cellulose membrane. They absorb no heparin.

EXAMPLES 4-25

The cellulose derivatives listed in the table were synthesized by the same methods as in Example 1, 2, or 3. Membranes prepared from them by known procedures likewise showed outstanding biocompatibility and stability properties.

EXAMPLES 26

40.5 g (0.25 mole) of linters cellulose was made alkaline for 3 h at 20° C. with 1 kg of 20% aqueous sodium hydroxide solution. The alkali-cellulose was then pressed to a wet weight of 100 g, taken up in 1 liter of toluene, and reacted with 92 g (0.25 mole) of epoxydodecane for 48 h at 100° C. The reaction product was filtered by suction, washed successively with ethanol, water, and ethanol until free of alkali, and dried in a vacuum oven at 60° C.

Membranes prepared from it by known procedures showed a C5a reduction of 70% compared to the unmodified cellulose membrane. The membranes absorb no heparin.

TABLE

| Ex. No. | Etherification Agent | Molar Ratio Cellulose:Eth. Agent | x | $C_{5a}$ Reduction % |
|---|---|---|---|---|
| 4 | Benzyl chloride | 1:0.25 | 0.10 | 85 |
| 5 | Benzyl chloride | 1:0.40 | 0.16 | 93 |
| 6 | Benzyl chloride | 1:0.50 | 0.20 | 94 |
| 7 | Benzyl chloride | 1:0.80 | 0.30 | 96 |
| 8 | Benzyl chloride | 1:1.00 | | 97 |
| 9 | Benzyl chloride | 1:1.50 | | 96 |
| 10 | Benzyl chloride | 1:2.50 | 0.80 | 98 |
| 11 | Benzyl chloride | 1:4.50 | 1.63 | 99 |
| 12 | Benzyl chloride | 1:6.00 | 2.55 | 90 |
| 13 | 4-Methylbenzyl chloride | 1:0.50 | 0.15 | 80 |
| 14 | 4-Methylbenzyl chloride | 1:1.00 | | 88 |
| 15 | 4-Methylbenzyl chloride | 1:2.00 | | 96 |
| 16 | 4-Methylbenzyl chloride | 1:3.00 | | 93 |
| 17 | 2-Methylbenzyl chloride | 1:1.00 | | 85 |
| 18 | 4-Chlorobenzyl chloride | 1:0.35 | 0.11 | 83 |
| 19 | 4-Chlorobenzyl chloride | 1:0.50 | 0.12 | 85 |
| 20 | 4-Chlorobenzyl chloride | 1:0.75 | 0.13 | 88 |
| 21 | 4-Chlorobenzyl chloride | 1:1.00 | | 96 |
| 22 | 4-Chlorobenzyl chloride | 1:1.50 | 0.25 | 94 |
| 23 | 4-Chlorobenzyl chloride | 1:2.00 | | 89 |
| 24 | 1-Bromohexane | 1:3.00 | 0.40 | 65 |
| 25 | 1-Bromododecane | 1:3.00 | 0.20 | 70 |

What is claimed is:

1. Dialysis membrane for hemodialysis in the form of films, tubular films, or hollow filaments consisting of polysaccharide ethers, wherein the polysaccharide ether has a structure shown by the formula

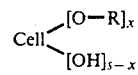

in which Cell is the skeleton of an unmodified cellulose molecule or of a chitin molecule, without hydroxyl groups, and in each case, s is 3 in the unmodified cellulose molecule and 2 in the chitin molecule, x corresponds to the degree of etherification which is in the range from 0.08 to (s −0.4), and in which R is at least one compound selected from the group consisting of optionally substituted alkyl, alkenyl, alkynyl, cycloalkyl, cycloalkenyl, cycloalkynyl, arylalkyl, arylalkenyl, arylalkynyl, bisarylalkyl, bisarylalkenyl, bisarylalkynyl group with 5 to 40 carbon atoms, the radical of an optionally substituted condensed aromatic compound and the radical of an optionally substituted heterocyclic compound.

2. The dialysis membrane of claim 1, wherein R is substituted with a nonionic group selected from the group consisting of halogen, nitrile, nitro, R'O—, R'S—, RR'CO—, R'CS—, R'SO—, R'SO$_2$, and an ester group, in which R'=H or R.

3. The dialysis membrane of claim 1, wherein R is substituted with an ionic group selected from the group consisting of carboxyl, phosphonate, silicate and sulfonate groups.

4. The dialysis membrane of claim 1, wherein R is an optionally substituted benzyl, methylbenzyl, chlorobenzyl, hexyl, dodecyl, hydroxydodecyl, or octadecyl group.

5. The dialysis membrane of claim 1, wherein x=0.1 to 0.5.

6. The dialysis membrane of claim 1, wherein s=2 and x =0.5 to 1.5.

7. The dialysis membrane of claim 1, wherein s=3 and x=0.5 to 2.0.

* * * * *

UNITED STATES PATENT AND TRADEMARK OFFICE
CERTIFICATE OF CORRECTION

PATENT NO. : 5,171,444
DATED : December 15, 1992
INVENTOR(S) : Michael DIAMANTOGLOU et al It is certified that error appears in the above-identified patent and that said Letters Patent is hereby corrected as shown below:

Col. 3, line 27, change "hepain" to --heparin--

Col. 4, line 16, change "00.5" to --0.5--.

Col. 5, line 31, "change "32" to --=--;

line 52, change "EXAMPLES" to --EXAMPLE--.

Col. 6, claim 2, line 52, change "RR'CO-" to --R'CO---; change "R'SO$_2$," to --R'SO$_2$-,--.

Signed and Sealed this

Nineteenth Day of October, 1993

BRUCE LEHMAN

Attest:

Attesting Officer     Commissioner of Patents and Trademarks